No. 695,193. Patented Mar. 11, 1902.
W. H. BUNDY.
WORKMAN'S TIME RECORDER.
(Application filed July 24, 1901.)

(No Model.) 5 Sheets—Sheet 1.

WITNESSES:
Chas. J. Jones.
Wm. T. Brewer.

INVENTOR
Willard H. Bundy.

BY
Hoey & Parsons.
ATTORNEYS

THE NORRIS PETERS CO., PHOTO-LITHO., WASHINGTON, D. C.

No. 695,193. Patented Mar. 11, 1902.
W. H. BUNDY.
WORKMAN'S TIME RECORDER.
(Application filed July 24, 1901.)
(No Model.) 5 Sheets—Sheet 2.
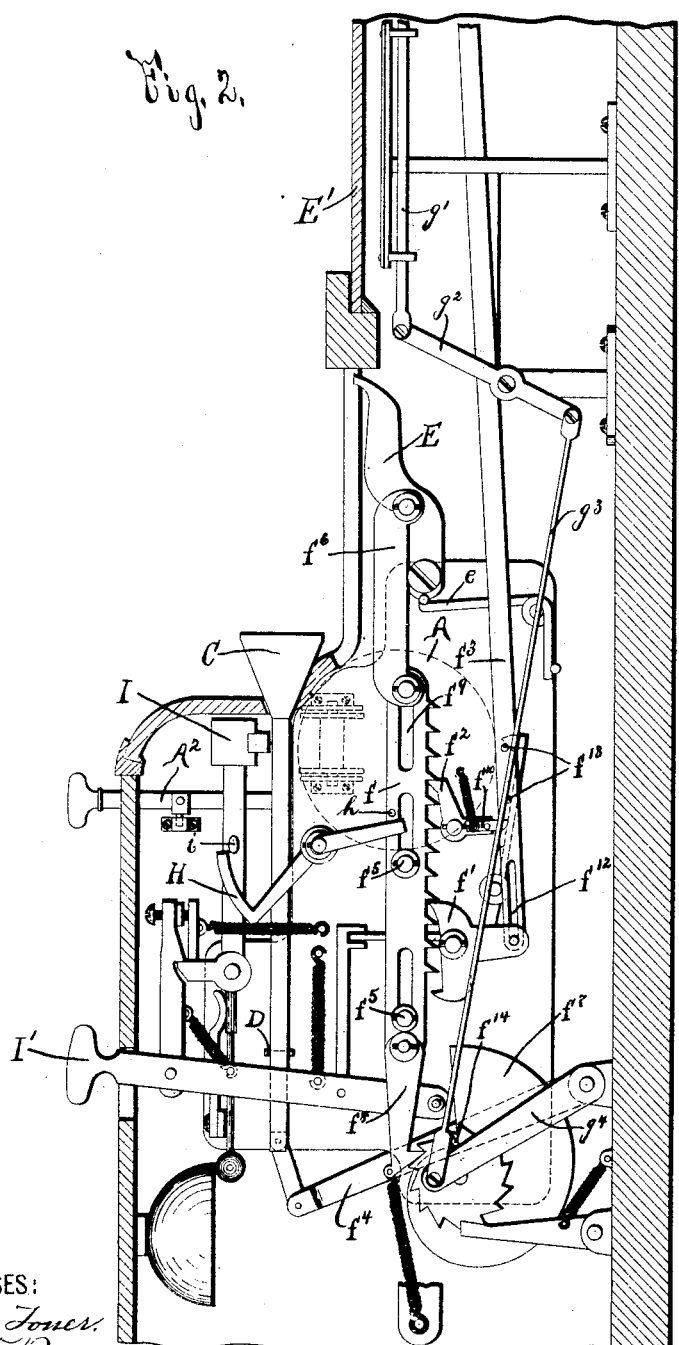

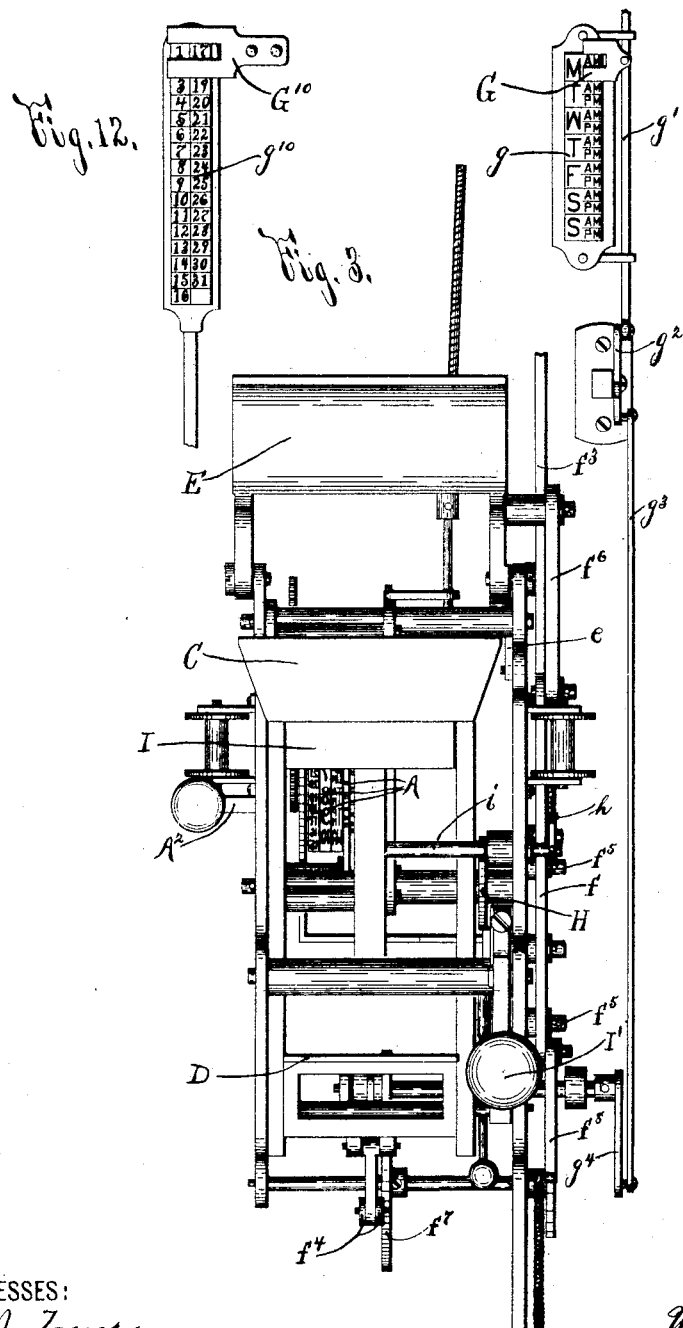

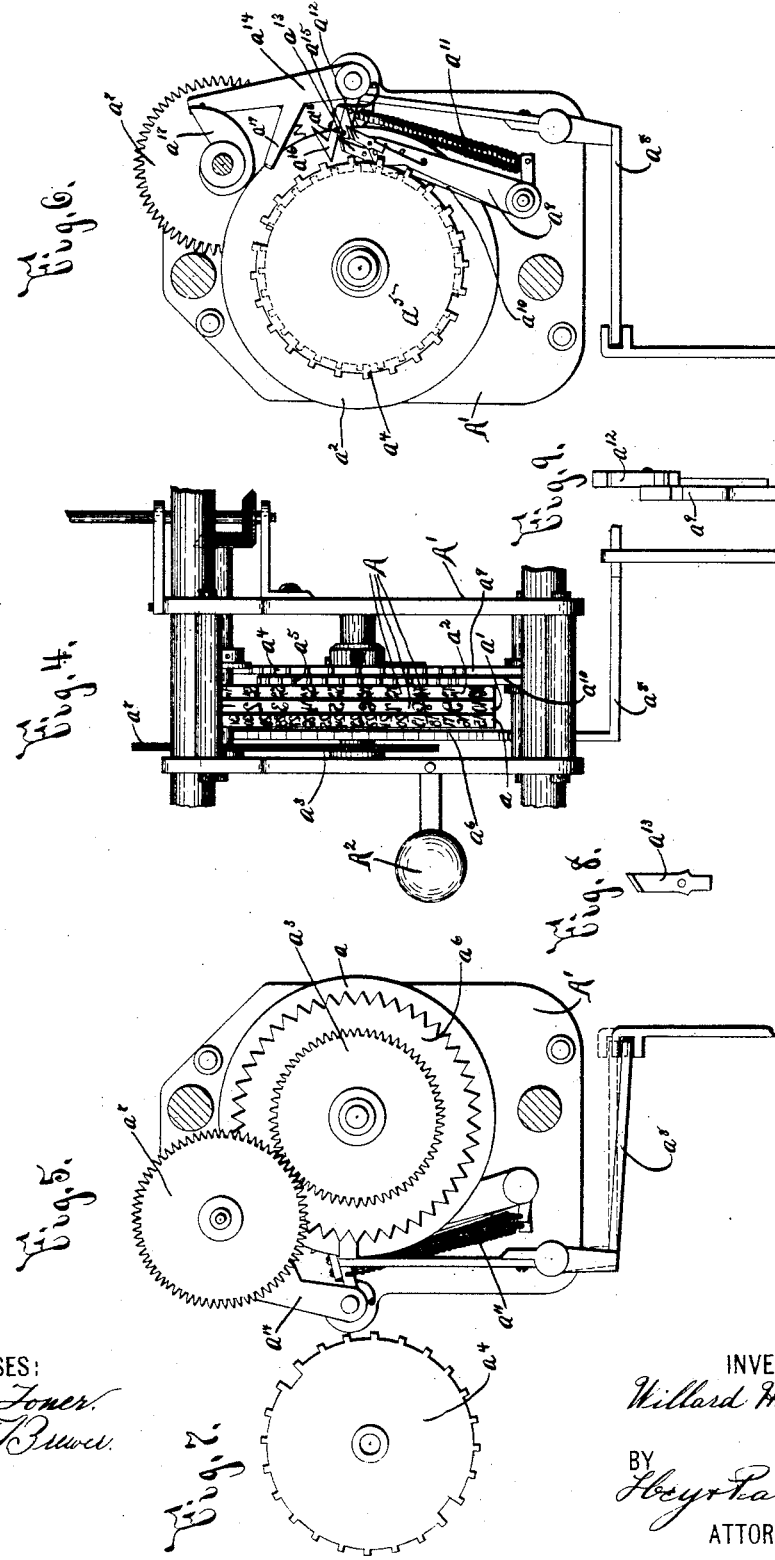

No. 695,193. Patented Mar. 11, 1902.
W. H. BUNDY.
WORKMAN'S TIME RECORDER.
(Application filed July 24, 1901.)
(No Model.) 5 Sheets—Sheet 5.

WITNESSES:
Chas. J. Foner.
Wm. F. Brewer.

INVENTOR
Willard H. Bundy
BY
Hoey & Parsons
ATTORNEYS.

UNITED STATES PATENT OFFICE.

WILLARD H. BUNDY, OF BINGHAMTON, NEW YORK.

WORKMAN'S TIME-RECORDER.

SPECIFICATION forming part of Letters Patent No. 695,193, dated March 11, 1902.

Application filed July 24, 1901. Serial No. 69,509. (No model.)

*To all whom it may concern:*

Be it known that I, WILLARD H. BUNDY, of Binghamton, in the county of Broome and State of New York, have invented a certain new and useful Time-Recorder, of which the following is a specification.

My invention has for its object the production of a time-recorder which is particularly simple in construction and efficient in operation; and to this end it consists in the combination, construction, and arrangement of the component parts of a time-recorder, as hereinafter fully described, and pointed out in the claims.

In describing this invention reference is had to the accompanying drawings, in which like letters indicate corresponding parts in all the views.

Figure 1:
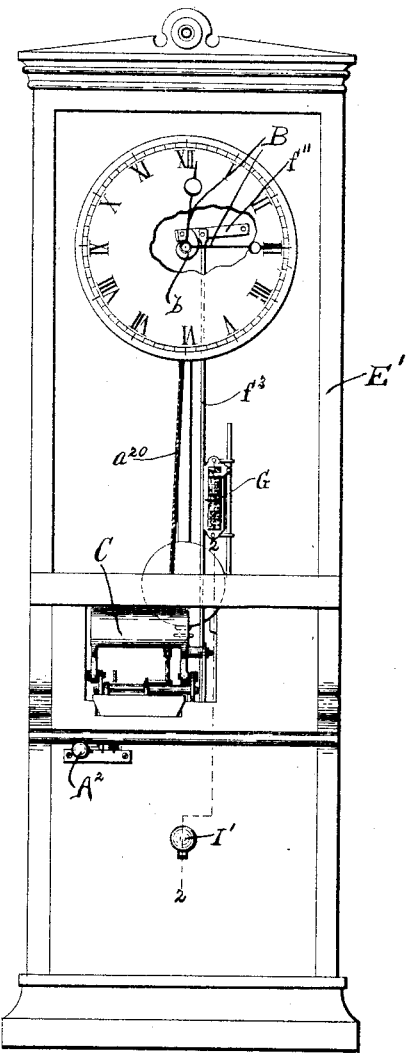
Figure 10:
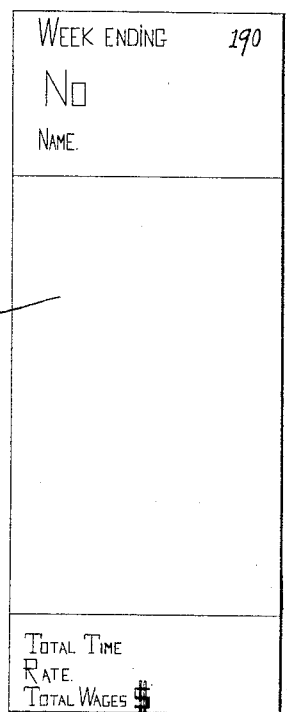
Figure 11:
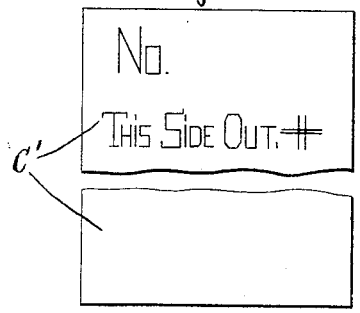
Figure 13:
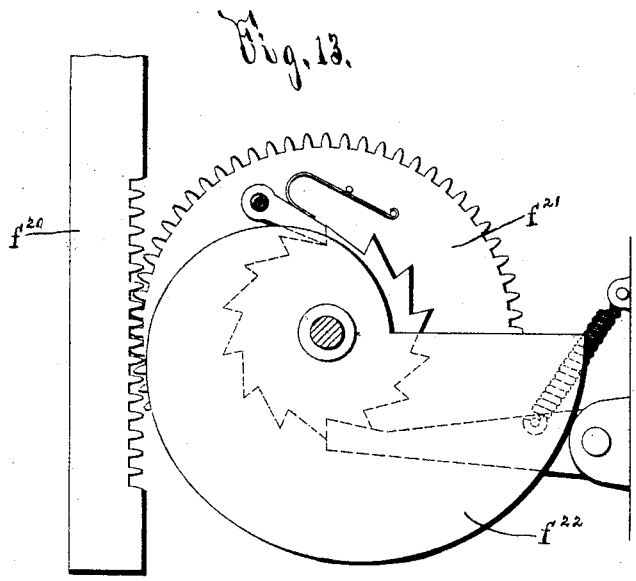
Figure 14:
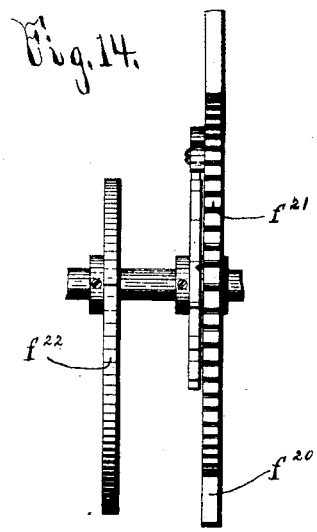

Figure 1 is a face view, partly broken away, of a preferred embodiment of my invention. Fig. 2 is a vertical sectional view taken on line 2 2, Fig. 1. Fig. 3 is an elevation of some of the parts seen in Fig. 2. Figs. 4, 5, and 6 are respectively face view and opposite side elevations of the detached marker and contiguous portions of the time-recorder. Figs. 7, 8, and 9 are detail views of parts of said recorder. Figs. 10 and 11 are opposite face views of the card generally used with this time-recorder, a portion of said card being broken away in Fig. 11. Fig. 12 is an elevation of a modified construction of indicating-surface for said time-recorder. Figs. 13 and 14 are detail views of a modified construction of some of the parts for connecting the intermittently-moving actuating member to the movable stop for the cards.

The illustrated embodiment of my invention comprises a marker A, a time-movement B, a guide C for the cards or other articles which receive the records from the marker, a stop D for limiting the movement of the cards in the guide C relatively to the marker and determining the position of the impressions by the marker upon the cards, a closure E for controlling the entrance of the cards within said guide, connections between the time-movement, the stop, and the closure, an indicator G for enabling the user of the time-recorder to readily ascertain the position of the stop D relatively to the marker A and the relative position upon the cards of the records to be applied thereto, and means for preventing the operation of the marker A during the movement of the stop D. It will be understood, however, that one or more of said parts may be dispensed with, if desired.

The marker A, Figs. 4, 5, and 6, may be of any desirable form, size, and construction; but I have here shown one of special construction provided with disks $a$ $a'$ $a^2$ for respectively recording minutes, hours, and intervals of time greater than hours, as days and the subdivisions thereof, represented by the abbreviations "A. M." and "P. M." Said disks $a$ $a'$ $a^2$ are respectively fixed to a driving-wheel $a^3$ and spacing-disks $a^4$ $a^5$. The driving-wheel $a^3$ is also fixed to a setting-disk $a^6$ for alining the recording-disk $a$ with the disk $a'$ and is driven by a wheel $a^7$, which makes one revolution per hour and is suitably connected, as by bevel-gears and a flexible shaft $a^{20}$, Figs. 1, 3, and 4, to the minute-shaft of the time-movement B, presently described. Said setting-disk $a^6$ is actuated by any desirable lever $a^8$, having one end provided with a spring-arm carrying a substantially V-shaped tooth movable into notches of corresponding shape in the periphery of the disk $a^6$ and having its other end connected by any suitable means to the hand-lever I' or other desirable part of the time-recorder for actuating the lever $a^8$ whenever a record is about to be made by the time-recorder.

The spacing-disk $a^4$, Fig. 7, is of greater diameter than the spacing-disk $a^5$, and both of said disks are formed with notches in their peripheries, one or more of the notches of the disk $a^4$ being of increased depth for registering with the notches of the disk $a^5$. I have here shown the spacing-disks $a^4$ $a^5$ as respectively provided with twenty-four and twenty-eight notches; but it is obvious that the number of said notches may be varied as desired. Said spacing-disks $a^4$ $a^5$ are respectively held in their adjusted position by pivoted stop-levers $a^9$ $a^{10}$, normally forced to their operative position by springs $a^{11}$ and provided with latches $a^{12}$ $a^{13}$, Figs. 8 and 9, pivoted, respectively, to the stop-levers $a^9$ $a^{10}$. The upper ends of the latches $a^{12}$ $a^{13}$ are prevented from movement away from the spacing-disks $a^4$ $a^5$ independently of the levers $a^9$ $a^{10}$ and are free to move in the opposite direction independently of said levers $a^9$ $a^{10}$ against suitable springs. The stop-levers $a^9$ $a^{10}$ are forced from their operative position by an actuating-lever $a^{14}$, connected to the springs $a^{11}$ and having diverging arms—one being provided with a projecting shoulder $a^{15}$ and a spring-actuated sliding pawl $a^{16}$ for respectively engaging an inclined face of the latch $a^{12}$ and entering the peripheral notches in the spacing-disks $a^4$ $a^5$ and the other being provided with means, as a pin, engaged with a cam $a^{17}$, which is formed with an inwardly-extending cut-out for receiving said pin and is fixed to the shaft for the wheel $a^7$, previously described. Said sliding pawl $a^{16}$ is forced toward the spacing-disks $a^4$ $a^5$ by any desirable spring and is provided with a projecting shoulder $a^{18}$ for engaging an inclined face of the latch $a^{13}$.

Whenever the pin on the lever $a^{14}$, engaged with the cam $a^{17}$, enters the cut-out in said cam, the springs $a^{11}$ rock the lever $a^{14}$ on its pivot and cause the shoulder $a^{15}$ to engage the inclined face of the latch $a^{12}$ and the pawl $a^{16}$ to enter one of the notches of the spacing-disk $a^4$ and advance said disk a single tooth. As the spacing-disk $a^4$ is making its advance movement the shoulder $a^{15}$ is disengaged from the inclined face of the latch $a^{12}$, whereupon the corresponding spring $a^{11}$ returns the stop-lever $a^9$ to its normal position for preventing the advance of the spacing-disk $a^4$ more than a single step. This result may also be facilitated by a stop-arm $a^{19}$, provided on the lever $a^{14}$ and movable into the notches of the spacing-disk $a^4$. In case one of the notches of increased depth of the spacing-disk $a^4$ is registered with the pawl $a^{16}$ at the time the lever $a^{14}$ commences its operation the spring bearing against the pawl $a^{16}$ will move said pawl lengthwise until its shoulder $a^{18}$ is in position to engage the inclined face of the latch $a^{13}$, and as the lever $a^{14}$ is rocked by the springs $a^{11}$ both stop-levers $a^9$ $a^{10}$ will be forced from their operative position by the shoulders $a^{15}$ $a^{18}$ and both spacing-disks will be operated by the pawl $a^{16}$.

The marker A and part of the connections between the wheel $a^7$ and the minute-shaft of the time-movement B are mounted on a suitable carriage A', which is movable crosswise of the guide C, presently described, in order to vary the position of said marker relatively to the card C' in the guide when applying the record to said card. This movement of the marker and its carriage is permitted by a flexible shaft $a^{20}$, which forms part of the connections between the wheel $a^7$ and the minute-shaft of the time-movement B and facilitates the setting of the minute-recording disk $a$ upon each operation of the time-recorder, as previously described. Said marker and its carriage may be moved, as described, by any suitable means, as a horizontally-movable pivoted hand-lever $A^2$, connected to the carriage A' by any desirable means unnecessary to describe herein. The time-movement B is of any suitable form, size, and construction, and, as best seen in Fig. 1, its hour-shaft is provided with a cam $b$, having an inwardly-extending cut-out. Said guide C is usually arranged in a vertical plane in front of the marker A, (indicated by dotted lines in Fig. 2,) is open from front to rear, as shown in Fig. 3, and is provided with an open upper end or inlet.

The stop D consists of a movable member which forms, essentially, the lower wall of the guide C and is elevated step by step, as presently described, being thereby adjustable relatively to the marker for causing the records on the cards C' to be applied one above the other.

The closure E is here shown as consisting of a lever having one end pivoted within the inclosing case E' of my recorder and its other end movable through an opening in said case over the open upper end or inlet of the guide C. Said closure is normally held upright within the case E' in its inoperative position, is movable by gravity to its operative position after the initial movement thereof from said inoperative position, and is manually returned from its operative position to its inoperative position. The illustrated means for holding the closure E in its inoperative position consists of a spring $e$, engaged with a notch in the pivoted end of said closure.

The connections between the time-movement B, the stop D, and the closure E preferably comprise a reciprocating actuating member $f$, escapement and stop pawls $f'$ $f^2$, a movable part $f^3$, the cam $b$, previously described, and a lever $f^4$, connected to the actuating member $f$ and to the stop D. Said actuating member $f$ is movable downwardly step by step by gravity, is guided in its movement by any desirable means, as pins $f^5$, movable in slots therein, and is provided with teeth for engaging the escapement and stop pawls $f'$ $f^2$, presently described. One end of the actuating member $f$ is connected by a link $f^6$ to the closure E and its opposite end is provided with means for rotating a cam $f^7$, being here shown as pivoted to a pawl $f^8$, engaged with a ratchet-wheel fixed to the shaft for the cam $f^7$. One end of the link $f^6$ is usually pivoted to the closure E and its opposite end is provided with a pivot movable in a lengthwise slot $f^9$ in said actuating member. As the actuating member $f$ commences a downward movement or step, when the closure is in its inoperative position, said member $f$ rocks the closure E on its pivot against the action of the spring $e$, thus effecting the initial movement of the closure from its inoperative position, whereupon the closure falls by gravity to its operative position, and said closure and actuating member move independently of each other during the balance of said downward movement or step, this independent movement being permitted by the slot $f^9$. Said slot $f^9$ also permits the actuating member $f$ to make a number of downward movements or steps when the closure E is in its operative position. Upon each downward movement of the actuating member $f$ the pawl $f^8$ feeds one tooth downwardly, and whenever the closure E is rocked by hand to its inoperative position said pawl causes the cam $f^7$ to make an advance movement corresponding to the downward movement of the actuating member. To illustrate: if the actuating member drops three teeth before the return of the closure E to its inoperative position the cam $f^7$ upon the return of said closure is caused to advance three teeth. The escapement and stop pawls $f'$ $f^2$ engage the teeth of the actuating member $f$, as previously stated, and are of any suitable form, the stop-pawl $f^2$ being here shown as provided with a pivoted latch $f^{10}$, having its outer end prevented from downward movement independently of the stop-pawl and free to move upwardly independently of said stop-pawl. Said movable part $f^3$ is connected at its upper end to a lever $f^{11}$, provided with a shoulder engaging the cam $b$, and is provided at its lower end with a slot $f^{12}$ for receiving a shoulder projecting from the escapement-pawl $f'$, and with shoulders $f^{13}$ for successively engaging the latch $f^{10}$ of the stop-pawl $f^2$. The escapement and stop pawls $f'$ $f^2$, the movable part $f^3$, the lever $f^{11}$, and the cam $b$ thus form connections between the actuating member $f$ and the clock-movement B, and the movable part $f^3$, the lever $f^{11}$, and the cam $b$ form connections between the pawls $f'f^2$ and said clock-movement.

As the hour-shaft of the time-movement B completes each revolution the shoulder of the lever $f^{11}$ enters the inwardly-extending cut-out of the cam $b$, whereupon said lever and the movable part $f^3$ drop downwardly a limited distance. During the downward movement of the part $f^3$ the lower shoulder $f^{13}$ forces the stop-pawl $f^2$ from its operative position, permitting the actuating member $f$ to descend slightly until one of its teeth engages the upper end of the escapement-pawl $f'$, and as said movable part $f^3$ continues its downward movement the upper shoulder $f^{13}$ forces the stop-pawl $f^2$ from its operative position and the upper wall of the slot $f^{12}$ encounters the shoulder of the escapement-pawl $f'$ and rocks said pawl $f'$ on its pivot for withdrawing the upper end thereof from engagement with the actuating member $f$ and forcing its lower end into position to engage said actuating member as the same completes a downward movement or step. Upon the upward movement of the part $f^3$, effected by the revolution of the cam $b$, the upper shoulder $f^{13}$ is elevated and permits the stop-pawl $f^2$ to assume its operative position, the lower shoulder $f^{13}$ passes above the stop-pawl without varying the position thereof, owing to the freedom of the outer end of the latch $f^{10}$ to move upwardly independently of said stop-pawl, and the lower wall of the slot $f^{12}$ rocks the escapement-pawl $f'$ for forcing its upper end into position to be engaged by the overlying tooth of the actuating member when commencing its next downward movement or step. It is thus apparent that the actuating member $f$ makes a downward movement or step upon each complete revolution of the cam $b$.

The lever $f^4$ is fixed to a suitable rock-shaft, is connected by a link or other means to the stop D, and is rocked upwardly by the cam $f^7$, which engages a shoulder $f^{14}$ projecting from said lever. The shoulder $f^{14}$, the cam $f^7$, the ratchet-wheel fixed to the shaft for the cam $f^7$, and the pawl $f^8$ form means for connecting the lever $f^4$ to the actuating member $f$. As the cam $f^7$ is rotated step by step, as previously described, the stop D is intermittently raised and held in its adjusted position until said cam makes a complete revolution, whereupon the shoulder $f^{14}$ registers with an inwardly-extending cut-out in the cam $f^7$, and the lever $f^4$ and the stop D return to their depressed positions. The closure E is thus connected to the stop D in this illustrated embodiment of my invention by the link $f^6$, the actuating member $f$, the pawl $f^8$, the ratchet-wheel engaged by said pawl, the cam $f^7$, the lever $f^4$, and the link between the stop D and the lever $f^4$, and upon each movement of the closure E from its operative position to its inoperative position said connections are actuated by the closure for varying the position of the stop D.

The indicator G is illustrated as consisting of a bifurcated finger movable over an indicating-surface $g$, containing characters, as "M T," &c., designating the days of the weeks, and also the abbreviations "A. M." and "P. M.," arranged opposite each of said characters. Said finger is moved lengthwise of the indicating-surface $g$ by a reciprocating rod $g'$, connected to one end of a lever $g^2$, having its other end connected by a link $g^3$ to a lever $g^4$, fixed to the rock-shaft for the lever $f^4$. Upon each upward movement or step of the stop D, effected by the lever $f^4$, as previously described, the indicator or finger G is actuated by the parts $g'$ $g^2$ $g^3$ $g^4$ to move downwardly a corresponding movement or step, it being understood that two of said movements or steps are made for each of the characters "M T," &c.

The means for preventing the operation of the marker during the movement of the stop D consists of a lever H, having one end arranged in the path of a shoulder $h$, provided on the actuating member $f$, and its other end movable into engagement with a shoulder $i$ on the hammer I, which is operated by the hand-lever I' in the usual manner, unnecessary to describe herein, in order to cause the marker to make a record on the card C'.

In addition to the preferred embodiment of my invention I have shown in Figs. 12, 13, and 14 an indicating-surface $g^{10}$ and also connections between the actuating member and the cam for raising the lever $f^4$, which are somewhat different in construction from the corresponding parts previously described. Said indicating-surface $g^{10}$ is provided with the numerals "1" to "30," inclusive, arranged in two parallel columns. When this indicating-surface is used, the indicator $G^{10}$ and the corresponding actuating member make an advance movement or step every twenty-four hours. The actuating member $f^{20}$ (shown in Figs. 13 and 14) is provided with teeth engaged with a gear $f^{21}$, fixed to the shaft for a cam $f^{22}$, corresponding to the cam $f^7$, previously described.

My time-recorder will now be readily understood upon reference to the foregoing description and the accompanying drawings, and it will be particularly noted that more or less change may be made in the construction and arrangement of the component parts thereof without departing from the spirit of my invention.

Having thus fully described my invention, what I claim as new, and desire to secure by Letters Patent, is—

1. The combination of a marker, a card-guide, means for varying the relative position of the marker and the card and thereby determining the position of the impression by the marker upon the card, a closure for the card-guide, said closure being connected to said means, substantially as and for the purpose described.

2. The combination of a marker, a card-guide, means for varying the relative position of the marker and the card and thereby determining the position of the impression by the marker upon the card, a closure for the card-guide, said closure being movable into its operative position for preventing the entrance of the card within the guide and being movable from its operative position to its inoperative position upon the operation of said means, a time-movement, and connections between the closure and the time-movement whereby the closure assumes its operative position when the time-movement makes a predetermined advance, substantially as and for the purpose specified.

3. The combination of a marker, a card-guide, a stop for limiting the movement of the card in said guide relatively to the marker and determining the position of the impression by the marker upon the card, a closure for the card-guide, and connections between the stop and the closure actuated by the closure for varying the position of the stop, substantially as and for the purpose described.

4. The combination of a marker, a card-guide, a stop for limiting the movement of the card in said guide relatively to the marker and determining the position of the impression by the marker upon the card, a closure for the card-guide, said closure being normally in its inoperative position and being movable manually from its operative position to its inoperative position, and connections between the stop and the closure actuated by the closure for varying the position of the stop, substantially as and for the purpose specified.

5. The combination of a marker, a card-guide, a stop for limiting the movement of the card in said guide relatively to the marker and determining the position of the impression by the marker upon the card, a closure for the card-guide, said closure being normally in its inoperative position and being movable by gravity to its operative position after the initial movement thereof from its inoperative position, and connections between the stop and the closure for effecting the initial movement of the closure from its inoperative position, said connections being actuated by the closure when moved from its operative position to its inoperative position for varying the position of the stop, substantially as and for the purpose set forth.

6. The combination of a marker, a card-guide, a stop for limiting the movement of the card in said guide relatively to the marker and determining the position of the impression by the marker upon the card, a closure for the card-guide, said closure being normally in its inoperative position and being movable by gravity to its operative position after the initial movement thereof from its inoperative position, connections between the stop and the closure for effecting the initial movement of the closure from its inoperative position, said connections being actuated by the closure when moved from its operative position to its inoperative position for varying the position of the stop, a time-movement, and connections between the former connections and the time-movement, substantially as and for the purpose described.

7. The combination of a marker, a card-guide, a stop for limiting the movement of the card in said guide relatively to the marker and determining the position of the impression by the marker upon the card, a closure for the card-guide, means for holding the closure in its inoperative position, and connections between the stop and the closure for forcing the closure from its inoperative position against the action of said means, said connections being actuated by the closure when moved to its inoperative position for varying the position of the stop, substantially as and for the purpose specified.

8. The combination of a marker, a card-guide, a stop for limiting the movement of the card in said guide relatively to the marker and determining the position of the impression by the marker upon the card, a closure for the card-guide, said closure being normally in its inoperative position, being movable by gravity to its operative position after the initial movement thereof from its inoperative position and being movable manually from its operative position to its inoperative position, means for holding the closure in its inoperative position, and connections between the stop and the closure for effecting the initial movement of the closure from its inoperative position against the action of said means, said connections being actuated by the closure when moved from its operative position to its inoperative position for varying the position of the stop, substantially as and for the purpose set forth.

9. The combination of a marker, a card-guide, a stop for limiting the movement of the card in said guide relatively to the marker and determining the position of the impression by the marker upon the card, a closure for the card-guide, said closure being normally in its inoperative position, being movable by gravity to its operative position after the initial movement thereof from its inoperative position and being movable manually from its operative position to its inoperative position, connections between the stop and the closure for effecting the initial movement of the closure from its inoperative position, said connections being actuated by the closure when moved from its operative position to its inoperative position for varying the position of the stop, a time-movement, and connections between the former connections and the time-movement, substantially as and for the purpose described.

10. The combination of a marker, a card-guide, a stop for limiting the movement of the card in said guide relatively to the marker and determining the position of the impression by the marker upon the card, a closure for the card-guide, an actuating member connected to the closure and movable by the closure, and connections between the stop and the actuating member for varying the position of the stop when the actuating member is moved by the closure, substantially as and for the purpose specified.

11. The combination of a marker, a card-guide, a stop for limiting the movement of the card in said guide relatively to the marker and determining the position of the impression by the marker upon the card, a closure for the card-guide movable from its operative position to its inoperative position and vice versa, an actuating member connected to the closure and movable for effecting movement of the closure, said actuating member being movable independently of the closure when said closure is in its operative position and being movable by the closure when said closure is moved from its operative position to its inoperative position, and connections between the actuating member and the stop for varying the position of the stop when the actuating member is moved by the closure, substantially as and for the purpose set forth.

12. The combination of a marker, a time-movement, a card-guide, a stop for limiting the movement of the card in said guide relatively to the marker and determining the position of the impression by the marker upon the card, a closure for the card-guide movable from its operative position to its inoperative position and vice versa, an actuating member connected to the closure and movable by gravity for effecting movement of the closure, said actuating member being movable by the closure when said closure is moved from its operative position to its inoperative position, movable escapement and stop pawls for the actuating member connected to the time-movement, and connections between the actuating member and the stop for varying the position of the stop when the actuating member is moved by the closure, substantially as and for the purpose set forth.

13. The combination of a marker, a card-guide, a stop for limiting the movement of the card in said guide relatively to the marker and determining the position of the impression by the marker upon the card, a closure for the card-guide, said closure being normally in its inoperative position, being movable by gravity to its operative position after the initial movement thereof from its inoperative position and being movable manually from its operative position to its inoperative position, an actuating member connected to the closure and movable by gravity for effecting the initial movement of the closure from its inoperative position, said actuating member being movable independently of the closure when said closure is in its operative position and being movable by the closure when said closure is moved from its operative position to its inoperative position, connections between the actuating member and the stop for varying the position of the stop when the actuating member is moved by the closure, a time-movement, and connections between the former connections and the time-movement, substantially as and for the purpose described.

14. The combination of a marker, a time-movement, a card-guide, a stop for limiting the movement of the card in said guide relatively to the marker, a pivoted closure for the card-guide, an actuating member movable step by step by gravity, a link connecting the closure and the actuating member, movable escapement and stop pawls for the actuating member connected to the time-movement, and connections between the actuating member and the stop for varying the position of the stop, substantially as and for the purpose set forth.

15. The combination of a marker, a time-movement, a card-guide, a stop for limiting the movement of the card in said guide relatively to the marker, a closure for the card-guide, said closure being normally in its inoperative position, being movable by gravity to its operative position after the initial movement thereof from its inoperative position and being movable manually from its operative position to its inoperative position, means for holding the closure in its inoperative position, an actuating member connected to the closure and movable step by step, and connections between the time-movement, the stop and the actuating member, substantially as and for the purpose described.

16. The combination of a marker, a time-movement, a card-guide, a stop for limiting the movement of the card in said guide relatively to the marker, a closure for the card-guide, an actuating member movable step by step by gravity for effecting movement of the closure, movable escapement and stop pawls for the actuating member, a cam actuated by the time-movement and provided with an inwardly-extending cut-out, a movable part having one end connected to means engaged with the cam and movable into the cut-out, and its other end provided with means for actuating the escapement-pawl and for successively actuating the stop-pawl to effect each advance movement of the actuating member, substantially as and for the purpose specified.

17. The combination of a marker, a guide for the article to be marked, a stop for limiting the movement of said article in the guide relatively to the marker, said stop being adjustable relatively to the marker for determining the position of the impression by the marker upon said article, and means for controlling the entrance of said article within the guide, said means being connected to the stop for varying the position thereof, substantially as and for the purpose set forth.

18. The combination of a marker, a time-movement, a card-guide, a stop for limiting the movement of the card in the guide relatively to the marker, said stop being adjustable relatively to the marker for determining the position of the impression by the marker upon the card, means for controlling the entrance of the card within the guide, and connections between the time-movement and said means, substantially as and for the purpose described.

19. The combination of a marker, a time-movement, a card-guide, a stop for limiting the movement of the card in the guide relatively to the marker, said stop being adjustable relatively to the marker for determining the position of the impression by the marker upon the card, a closure for the card-guide connected to the stop and movable manually from its operative position for varying the position of the stop, and connections between the time-movement and the closure, substantially as and for the purpose specified.

20. The combination of a card-guide, a time-movement, a marker, a stop for limiting the movement of the card in the guide relatively to the marker, said stop being adjustable relatively to the marker for determining the position of the marker upon the card, a carriage for the marker movable crosswise of the card-guide, a closure for the card-guide connected to the stop for varying the position thereof, and connections between the time-movement and the closure, substantially as and for the purpose set forth.

21. The combination of a marker, a card-guide, a stop for limiting the movement of the card in the guide relatively to the marker, and means for preventing the operation of the marker during the movement of the stop, substantially as and for the purpose described.

22. The combination of a marker, a card-guide, a stop for limiting the movement of the card in the guide relatively to the marker and determining the position of the impression by the marker upon the card, means for preventing the operation of the marker during the movement of the stop, a closure for the card-guide, and connections between the stop and the closure actuated by the closure for varying the position of the stop, substantially as and for the purpose specified.

23. The combination of a marker, a card-guide, a stop for limiting the movement of the card in the guide relatively to the marker and determining the position of the impression by the marker upon the card, a closure for the card-guide, an actuating member connected to the closure and movable by the closure, means for preventing the operation of the marker during the movement of the stop, said means being operated by the actuating member, and connections between the stop and the actuating member for varying the position of the stop when the actuating member is moved by the closure, substantially as and for the purpose set forth.

24. The combination of a marker, a card-guide, means for varying the relative position of the marker and the card and thereby determining the position of the impression by the marker upon the card, a movable indicator for indicating the position of the impression to be applied by the marker upon the card, a closure for the card-guide, said closure being connected to said means substantially as and for the purpose described.

25. The combination of a marker, a time-movement, a card-guide, a stop for limiting the movement of the card in the guide relatively to the marker and determining the position of the impression by the marker upon the card, a movable indicator for indicating the position of the impression to be applied by the marker upon the card, a closure for the card-guide, and an actuating member connected to the closure and movable step by step during the operation of the time-movement and movable by the closure, said actuating member being connected to the stop and the indicator, substantially as and for the purpose specified.

26. The combination of a time-movement, a marker comprising a disk for recording minutes, a second disk for recording hours, and a third disk for recording intervals of time greater than hours, as days and the subdivisions thereof represented by the abbreviations "A. M." and "P. M.," spacing-disks fixed respectively to the second and third recording-disks and formed with peripheral notches, one of the spacing-disks being of greater diameter than the other and having one of its notches of increased depth for registering with the notches of said other spacing-disk, stop-levers for engaging the spacing-disks and preventing rotation thereof, latches mounted on the stop-levers, an actuating member connected to the time-movement and provided with a sliding pawl for entering the notches of the spacing-disks and rotating said second and third recording-disks, said actuating-lever and sliding pawl being provided with means movable into engagement with the latches for rocking the stop-levers from their operative positions, and connections between the time-movement, and the first recording-disk, substantially as and for the purpose set forth.

27. The combination with a marker comprising a disk for recording minutes, a second disk for recording hours, and a third disk for recording intervals of time greater than hours, as days and the subdivisions thereof represented by the abbreviations "A. M." and "P. M.;" of a time-movement, a card-guide, a stop for limiting the movement of the card in said guide relatively to the marker and determining the position of the impression by the marker upon the card, a closure for the card-guide, connections between said disks of the marker and the time-movement for actuating said disks, and connections between the stop and the closure actuated by the closure for varying the position of the stop, substantially as and for the purpose set forth.

In testimony whereof I have hereunto signed my name, in the presence of two attesting witnesses, at Syracuse, in the county of Onondaga, in the State of New York, this 3d day of July, 1901.

WILLARD H. BUNDY.

Witnesses:
S. DAVIS,
D. LAVINE.